(12) United States Patent
Mahanta et al.

(10) Patent No.: US 11,630,685 B2
(45) Date of Patent: Apr. 18, 2023

(54) HYPERVISOR AND CONTAINER PLACEMENT AND COST OPTIMIZATION UTILIZING MACHINE LEARNING

(71) Applicant: SAP SE, Walldorf (DE)

(72) Inventors: Prabal Mahanta, Bangalore (IN); Nishii Bharill, Bangalore (IN); Swati Verma, Delhi (IN)

(73) Assignee: SAP SE, Walldorf (DE)

( * ) Notice: Subject to any disclaimer, the term of this patent is extended or adjusted under 35 U.S.C. 154(b) by 391 days.

(21) Appl. No.: 16/743,328

(22) Filed: Jan. 15, 2020

(65) Prior Publication Data

US 2021/0216346 A1    Jul. 15, 2021

(51) Int. Cl.
  G06F 9/455    (2018.01)
  G06F 9/38     (2018.01)
  G06F 16/29    (2019.01)
  G06N 20/00    (2019.01)

(52) U.S. Cl.
  CPC ........ *G06F 9/45558* (2013.01); *G06F 9/3891* (2013.01); *G06F 16/29* (2019.01); *G06N 20/00* (2019.01); *G06F 2009/4557* (2013.01)

(58) Field of Classification Search
  CPC .... G06F 9/45558; G06F 9/3891; G06F 16/29; G06F 2009/4557; G06N 20/00
  See application file for complete search history.

(56) References Cited

U.S. PATENT DOCUMENTS

| | | | | |
|---|---|---|---|---|
| 11,526,557 B2 * | 12/2022 | Wang | ....................... | G06F 16/93 |
| 2019/0317935 A1 * | 10/2019 | Berti | ........................ | G06F 16/27 |
| 2019/0361728 A1 * | 11/2019 | Kumar | ..................... | H04L 67/34 |
| 2021/0019194 A1 * | 1/2021 | Bahl | ........................ | H04L 67/34 |
| 2021/0158147 A1 * | 5/2021 | Vinod | ....................... | G06N 3/08 |

OTHER PUBLICATIONS

Examiner Search result on "Google Kubernetes" (Year: 2022).*
Examiner search result on "google cloud preemptible VM instances" (Year: 2022).*
Akyildiz et al., "Performance Optimization of Distributed-System models with Unreliable servers", IEEE Transactions on Reliability, vol. 29, No. 2, Jun. 1990 (Year: 1990).*

* cited by examiner

*Primary Examiner* — Lewis A Bullock, Jr.
*Assistant Examiner* — Kevin X Lu
(74) *Attorney, Agent, or Firm* — Buckley, Maschoff & Talwalkar LLC

(57) ABSTRACT

According to some embodiments, an automated provisioning system may receive a customer demand associated with an application to be executed in a cloud-based computing environment. The automated provisioning system may include a process allocator to communicate with Virtual Machine ("VM") and container provisioners and determine cluster data. A machine learning based microservice setup platform, coupled to the automated provisioning system, may receive the cluster data and information about the customer demand. The machine learning based microservice setup platform may then execute policy rules based on the cluster data (and information about the customer demand) and generate a recommendation for the customer demand. The automated provisioning system may then assign the customer demand to one of a VM-based infrastructure and a container-based infrastructure in accordance with the recommendation generated by the machine learning based microservice setup platform.

17 Claims, 19 Drawing Sheets

Start Algorithm

*Let gDC pDC && thM = 0.4 && thC = .6*
If tM >= .40 *M && tC >= .60*C,
measure tsVM
spawn(VM)
install(app)
start(VM+app)
measure tuVM
btVM = tuVM – tsVM
measure tsCT
spawn(Container)
install(app)
start(CT+app)
measure tuCT
btCT = tuCT – tsCT
if btVM>0.50*btCT then
{delete(VM),
restore(Services), record(CTstatus), STOP} else
{(measure SIVMtimeSTR, trigger(SIVM),
extend(SIVM-> .80*thC && .80*thM), measure
SIVMtimeSTP), (measure SICTtimeSTR,
trigger(SICT), extend(SIVM-> .80*thC &&
.80*thM), measure SICTtimeSTP) }
ptVM = SIVMtimeSTP – SIVMtimeSTR
ptCT= SICTtimeSTP – SICTtimeSTR
if ptCT > ptVM then { delete(CT),
restore(Services), record(VMstatus), STOP }

End Algorithm

FIG. 10

Start Algorithm

For DataLoadSize n && Variation k
do
    For f(VMdataset) g(VMextractionk)
    Normalise(Extraction)
    Upper Limit = [geometric mean] * [ (geometric deviation) (1.96 / (square root of [n − 1] ) ) ]
    Lower Limit = [geometric mean] / [ (geometric deviation) (1.96 / (square root of [n − 1] ) ) ]
    Record VM(Upper limit)
    Record VM(Lower limit)

For f(CTdataset) g(CTextractionk)
    Normalise(Extraction)
    Upper Limit = [geometric mean] * [ (geometric deviation) (1.96 / (square root of [n − 1] ) ) ]
    Lower Limit = [geometric mean] / [ (geometric deviation) (1.96 / (square root of [n − 1] ) ) ]
    Record CT(Upper limit)
    Record CT(Lower limit)
Measure Skewness and record Upper and Lower limit excluding Skewness
if Confidence(VM) > Confidence(CT)
    Rank(VM>CT for load n and Scenario k)
    Tune(CT)
    Record TuneData
else if Confidence(CT) > Confidence(VM)
    Rank(CT>VM for load n and Scenario k)
    Tune(VM)
    Record TuneData
STOP

End Algorithm

*FIG. 11*

HYPERVISOR AND CONTAINER PLACEMENT AND COST OPTIMIZATION UTILIZING MACHINE LEARNING

BACKGROUND

An enterprise may utilize applications or services executing in a cloud computing environment. For example, a business might utilize applications that execute at a data center to process purchase orders, human resources tasks, payroll functions, etc. Such applications may execute via a cloud computing environment to efficiently utilize computing resources (e.g., memory, bandwidth, disk usage, etc.). Note that deploying an application in a cloud computer environment can be done in a number of different ways. For example, an application could be deployed via a hypervisor and virtual machine or via a container (e.g., using Kubernetes). Moreover, various applications which were designed for hypervisors may coexist with modern container optimized technology. Some systems may optimize a virtual machine-based infrastructure (only) or a container cluster-based infrastructures (only) in a standalone fashion. Such an approach, however, does not individually manage clusters nor automate a provision mechanism for both technologies.

It would therefore be desirable to provide deployments for cloud-based computing environment applications in a more efficient and effective manner.

SUMMARY

Methods and systems may be associated with a cloud computing environment. According to some embodiments, an automated provisioning system may receive a customer demand associated with an application to be executed in the cloud-based computing environment. The automated provisioning system may include a process allocator to communicate with Virtual Machine ("VM") and container provisioners and determine cluster data. A machine learning based microservice setup platform, coupled to the automated provisioning system, may receive the cluster data and information about the customer demand. The machine learning based microservice setup platform may then execute policy rules based on the cluster data (and information about the customer demand) and generate a recommendation for the customer demand. The automated provisioning system may then assign the customer demand to one of a VM-based infrastructure and a container-based infrastructure in accordance with the recommendation generated by the machine learning based microservice setup platform.

Some embodiments comprise: means for receiving, at an automated provisioning system, a customer demand associated with an application to be executed in the cloud-based computing environment; means for communicating, by a process allocator of the automated provisioning system, with Virtual Machine ("VM") and container provisioners to determine cluster data; means for receiving, at a machine learning based microservice setup platform coupled to the automated provisioning system, the cluster data and information about the customer demand; means for executing, by the machine learning based microservice setup platform, policy rules based on the cluster data and information about the customer demand; means for generating, by the machine learning based microservice setup platform, a recommendation for the customer demand; and means for assigning, by the automated provisioning system, the customer demand to one of a VM-based infrastructure and a container-based infrastructure in accordance with the recommendation generated by the machine learning based microservice setup platform.

Some technical advantages of some embodiments disclosed herein are improved systems and methods to provide deployments for cloud-based computing environment applications in an efficient and effective manner.

BRIEF DESCRIPTION OF THE DRAWINGS

FIG. 10 is a runtime engine algorithm according to some embodiments.

FIG. 11 is a meta-learning system in accordance with some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Some embodiments described herein may analyze both Virtual Machine ("VM")-based infrastructure and a container-based infrastructure in a generic fashion to enable faster provisioning with intelligent geographical placement and smarter archival and decommissioning processes (e.g., with classification and ranking of both an application and infrastructure units). Note that dealing with both the Kubernetes cluster and VMware based data center setup is often confused with optimization or rearchitecting an existing application architecture. Often, the decision to select either a hypervisor or container approach becomes a one-sided decision. To overcome this challenge, and also to recommend optimizations, embodiments may utilize a Machine Learning ("ML")-based microservice setup mechanism which will may let any data center technology co-exist together and offer a mechanism to optimize placements, response times, classifications and accordingly execute via container and/or hypervisor core units. Moreover, embodiments may use a scoring mechanism for application ranking per technology stack and/or per geographic data center locations In addition, a recommendation of placement of containers and/or hypervisors may be based on policy rules in a hybrid technology stack-based data center.

Figure 1:
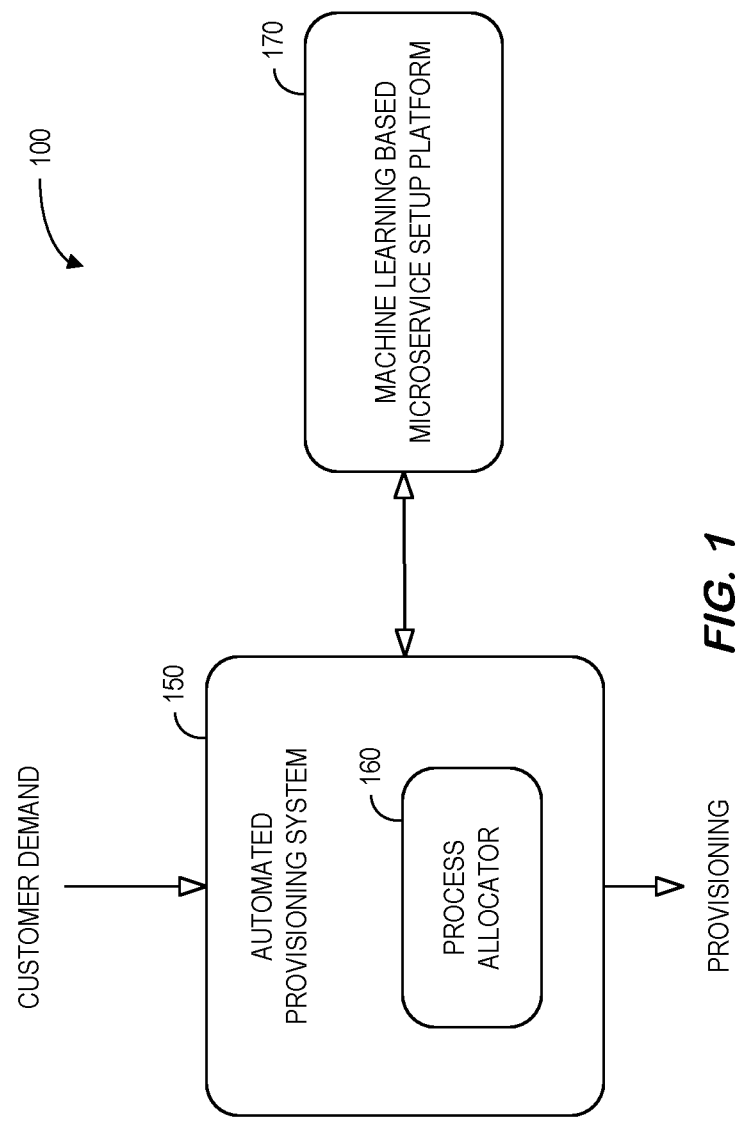
FIG. 1 is a high-level system architecture in accordance with some embodiments.

FIG. 1 is a high-level system 100 architecture in accordance with some embodiments. The system 100 includes an automated provisioning system 150, an process allocator 160, and a ML-based microservice setup platform 170. As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The ML-based microservice setup platform 170 may store information into and/or retrieve information from various data stores, which may be locally stored or reside remote from the ML-based microservice setup platform 170. Although a single ML-based microservice setup platform 170, automated provisioning system 150, and process allocator 160 are shown in FIG. 1, any number of such devices may be included. Moreover, various devices described herein might be combined according to embodiments of the present invention. For example, in some embodiments, an automated provisioning system 150 and process allocator 160 might comprise a single apparatus. The system 100 functions may be performed by a constellation of networked apparatuses, such as in a distributed processing or cloud-based architecture.

According to some embodiments, an operator or administrator may access the system 100 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to implement various rules and policies) and/or provide or receive automatically generated recommendations or results from the system 100.

Figure 2:
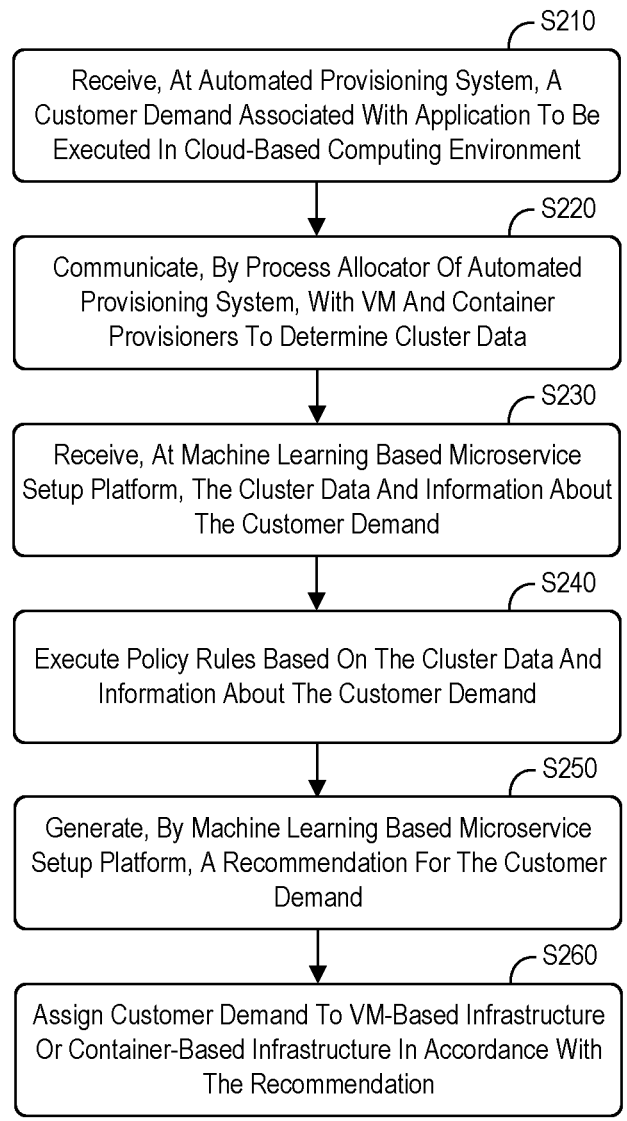
FIG. 2 is a method according to some embodiments.

FIG. 2 is a method that might be performed by some or all of the elements of any embodiment described herein. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S210, an automated provisioning system may receive a customer demand associated with an application to be executed in a cloud-based computing environment. At S220, a process allocator of the automated provisioning system may communicate with VM and container provisioners to determine cluster data. The cluster data might be associated with, for example, infrastructure parameters, network configuration parameters, cluster availability, etc.

At S230, a ML-based microservice setup platform may receive the cluster data and information about the customer demand. At S240, the ML-based microservice setup platform may execute policy rules based on the cluster data and information about the customer demand. According to some embodiments, ML-based microservice setup platform utilizes a cost optimization function, such as one associated with infrastructure cost, application cost based on response time, geographic data center cost, etc. At S250, the ML-based microservice setup platform may generate a recommendation for the customer demand. The automated provisioning system may the at S260 assign the customer demand to one of a VM-based infrastructure (e.g., associated with a hypervisor) and a container-based infrastructure (e.g., associated with Kubernetes clusters) in accordance with the recommendation generated by the ML-based microservice setup platform.

In this way, a system may provision a VM-based cluster and/or a Kubernetes cluster in an on-demand basis. Moreover, a hybrid-provisioner may handle all of the demands of a customer and provision the appropriate type of cluster accordingly. Plans and policies may be defined according to which a customer will be charged for either type of cluster. These plans might be, for example, defined using the following parameters:
infrastructure,
network configuration, and
cluster availability.

Figure 3:
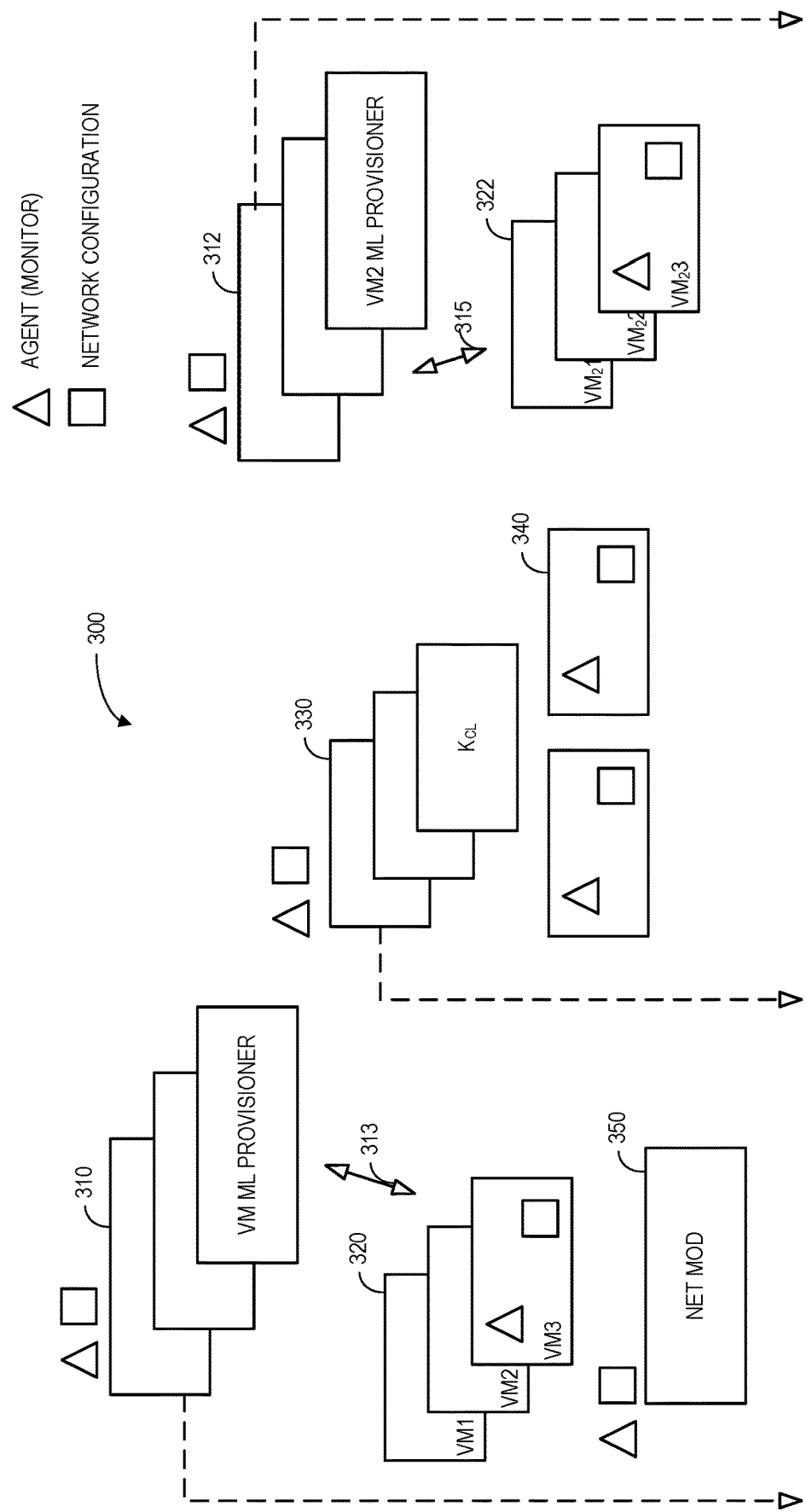
FIGS. 3 through 6 are a flow diagram of an overall cloud-based computing architecture in accordance with some embodiments.

FIGS. 3 through 6 are a flow diagram of an overall cloud-based computing architecture in accordance with some embodiments. In particular, FIG. 3 shows 300 a VM ML provisioner 310 associated 313 with a set of VMs 320. Moreover, a $K_{CL}$ Kubernetes cluster provisioner 330 and associated elements 340 are illustrated along with a second VM ML provisioner 312 associated 315 with VMs 322 (e.g., $VM_2 1$, $VM_2 2$, etc.). A network mod 350 may receive information from all of these elements. Note that the elements of FIG. 3 might each be associated with a agent or monitor (illustrated as triangles in FIG. 3) and/or a network configuration (illustrated as squares in FIG. 3). As used herein, the term "provisioner" may refer to a mechanism that takes demands from an end customer and forwards it to process-allocator. Information from the provisioners in FIG. 3 may then be provided to other parts of the architecture (illustrated with dashed lines in FIG. 3).

Figure 4:
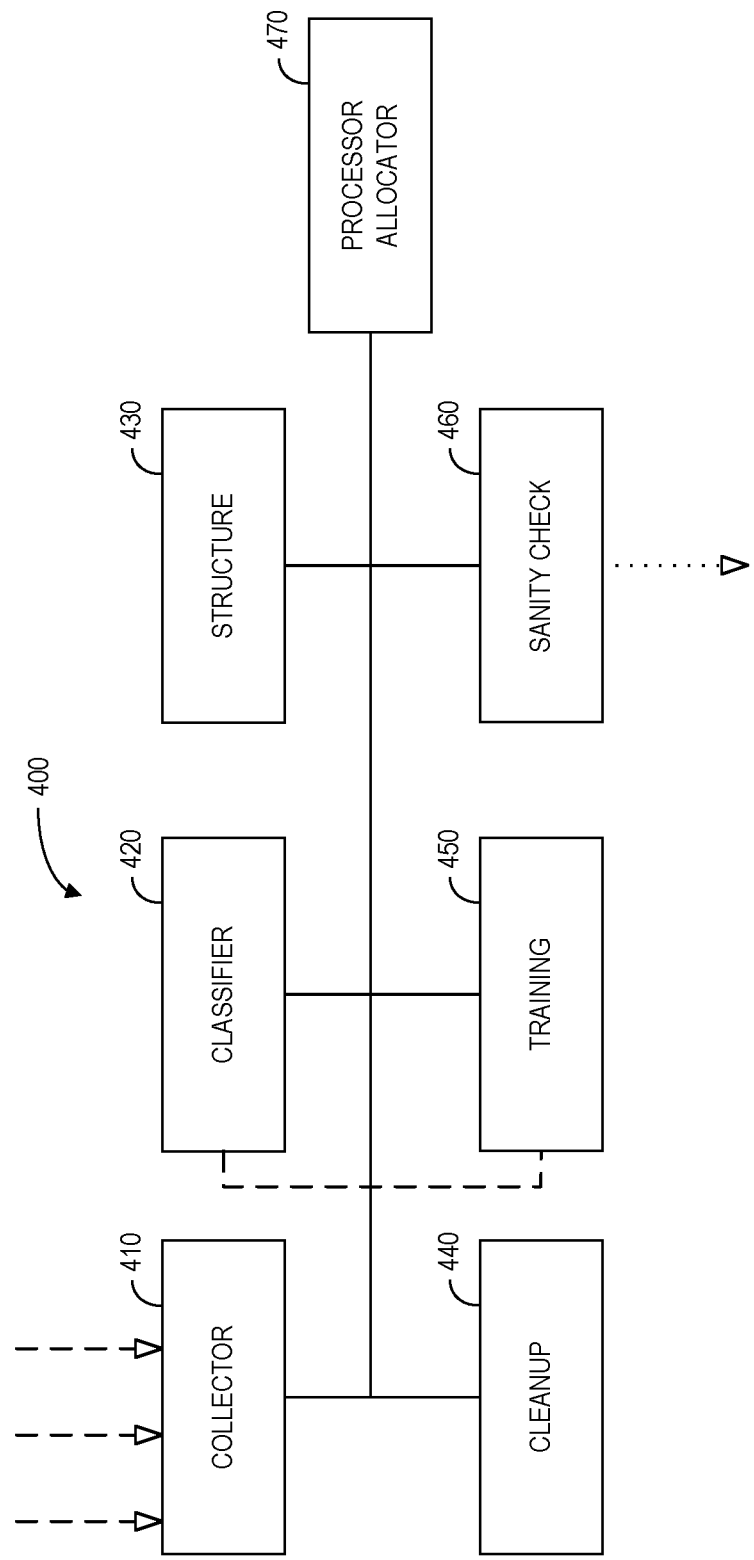

In particular, FIG. 4 shows 400 the information from the provisioners being received at a collector 410. The collector may be associated with a resource pool that has all the VMs and Kubernetes ("K8s") clusters. The collector 410 may communicate with the VM provisioners and K8s provisioners which each provision and manage their clusters. The agent monitor on each provisioner may, for example, monitor the infrastructure and other parameters for performance and cost computation. A cleanup System 440 may clean up all processed requests and orphaned resources. A classifier 420 may classify the requests in accordance with policies and then proceed with the request made by customer. Moreover, a training system 450 may take the input from classifier 420. Based on ML algorithms, the system may train itself to classify upcoming requests. A structural handle 430 may handle the catalogue for VMs and K8s clusters. A sanity checker 460 may perform all the sanity checks required before execution of the request via a processor allocator 470 (illustrated via a dotted line in FIG. 4).

Figure 5:
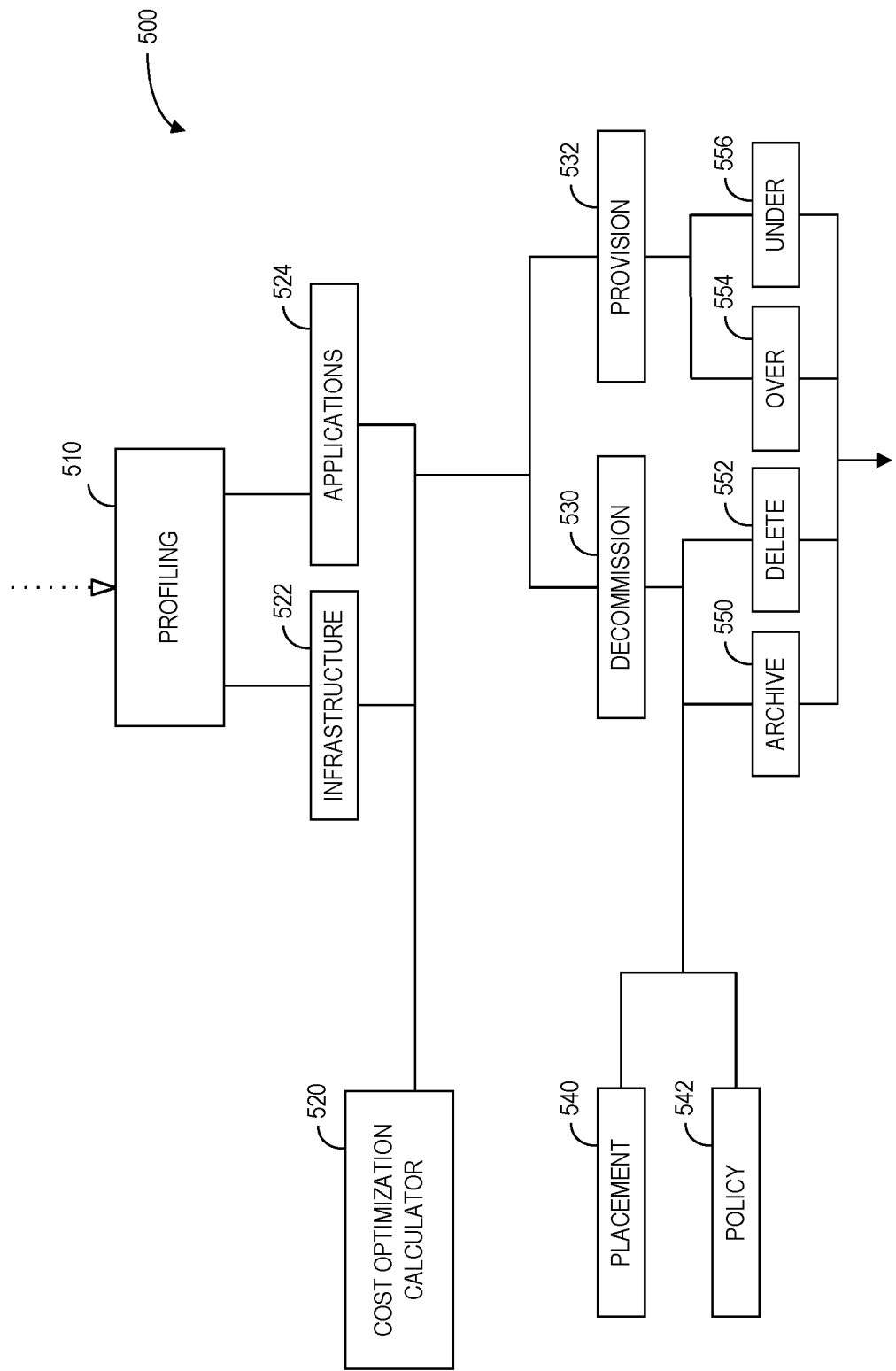

As illustrated in FIG. 5, a profiler 510 may process the request finally to the infrastructure and the application level. The profiler 510 may, for example, provide input to infrastructure 522 and applications 524 metrics. A cost optimization calculator 520 may consider both the infrastructure 522 and applications 524 running on the same for cost evaluation and optimization. There may be defined policies 542 and placement 540 based on which resources may be provisioned 352 (e.g., in connection with over-loaded 554 elements or under-loaded 556 element) or deprovisioned 530 (e.g., decommissioned via archive 550 or delete 552).

Figure 6:
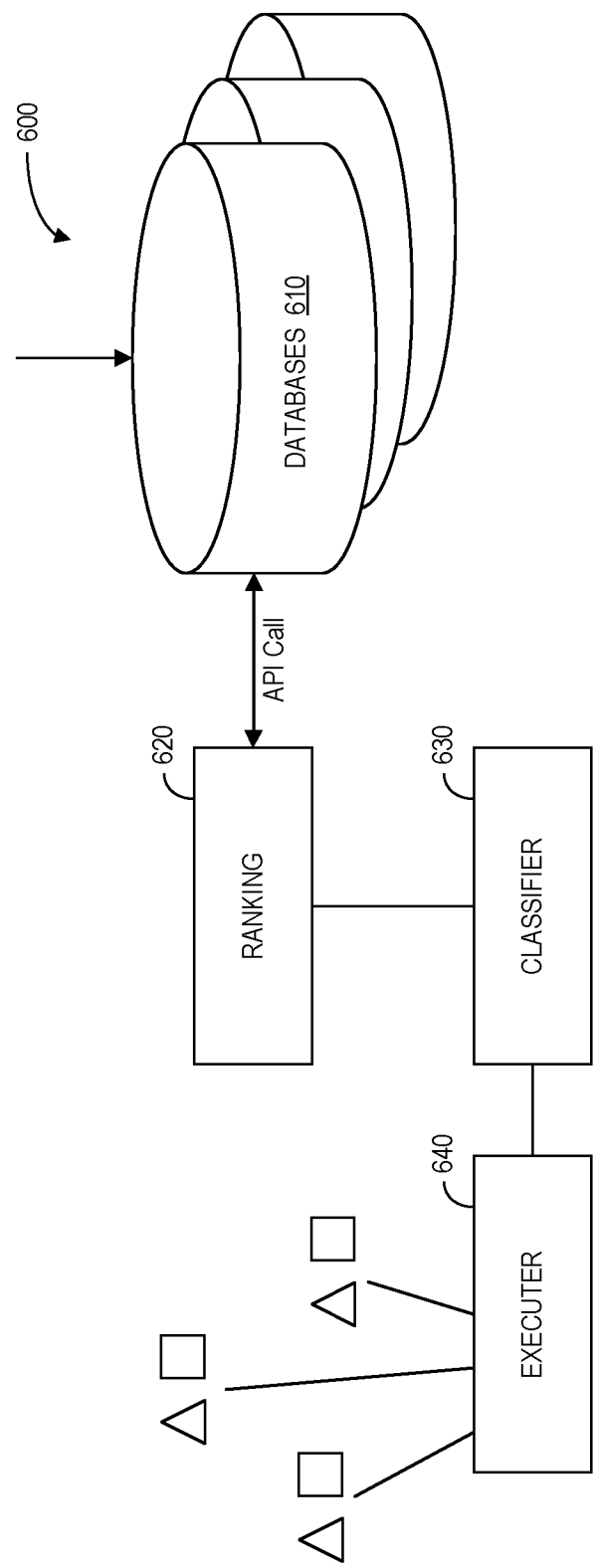

As illustrated in FIG. 6, every such request or demand may be stored in a database 610. According to some embodiments, there may be a ranking system 620 built on top of the database 610 entries, and the ranking results may be provided to an executor 640 via a classifier 630. Thus, embodiments may utilize ML algorithms that train the cost-optimizer as per customer demands for the provisioner and de-provisioner. Note that various optimization techniques might be employed include response time optimization, Pearson correlation coefficient approaches, etc. Note that different cost computations as per plans/policies might be used by a recommendation engine to make a recommendation. For example, to determine the ranking of various plans (and which is more cost effective), an infrastructure cost calculation might comprise:

$$Is_i = W_i + M_i - Rp_i - F_i$$

where $W_i$ is a workload response, $M_i$ is a Mean Time-to-Repair ("MTTR") response, $Rp_i$ is a power rate, and $F_i$ is a failure rate.

Other calculations might be associated with an application cost based on response time:

$$As_i = R_i + M_i - F_i + Ar_i + DBR_i$$

where $R_i$ is power rate for the application, $M_i$ is MTTR response. $DBR_i$ is a database response, $Ar_i$ is application response, and $F_i$ is a failure rate.

Still other calculations for the rankings might be associated with a geographical cost center cost:

$$Gsi = Isi + Asi$$

Any or all of these approaches may help the system recommend the best plan that a customer should use in view of their specific requirements.

Figure 7:
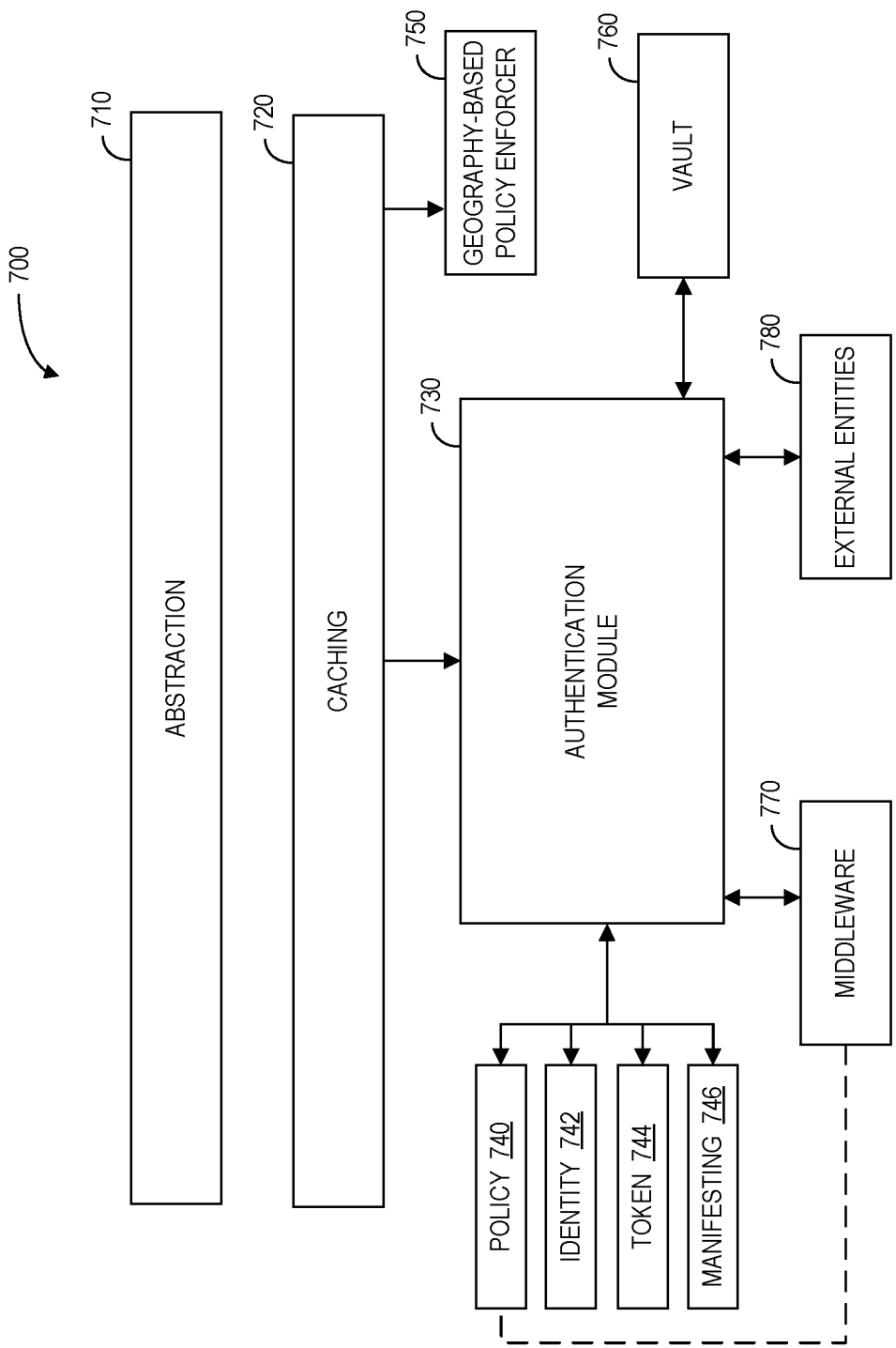
FIG. 7 is a blockchain architecture in accordance with some embodiments.

According to some embodiments, the system may enable blockchain-based resource tagging for status management at a hybrid infrastructure data center. For example, FIG. 7 is a blockchain architecture 700 in accordance with some embodiments. In particular, the architecture 700 includes abstraction 710, caching 720, and an authentication module 730 that access information in a vault 760 (e.g., associated with a secure, distributed ledger, such as one implemented via blockchain technology). In some embodiments, a geography-based policy enforcer 750 may implement various policies based on the location of a data center and/or a customer. Middleware 770 (e.g., associated with different cloud platforms) may communicate with the authentication module via policies 740. Similarly, identity 742, token 744, and manifesting 746 may communicate with the authentication module 730. External entities 780 (e.g., associated with federal privacy regulations or document retention requirements) may also be supported.

In this way, blockchain based authorization may help prevent subscription and/or privilege level misuse. For example, subscription-level fraud management might now be easily detectable using such a blockchain approach. In addition, semantic matchmaking may resolve semantic conflicts between different Platforms as a Service ("PaaS"). The architecture may provide for the independent and efficient deployment and/or governance of applications. Note that horizontal level access management may use a single abstraction layer across different cloud platforms. Vertical access binding with semantics and contextual information for a user may also be supported across the Infrastructure as a Service ("IaaS") and/or PAAS and Software as a Service ("SaaS") offering of any cloud platform. That is, implementing such optimizations in architecture may enable an access control abstraction layer. In some embodiments, it might be required on top of IAAS, PAAS, and/or SAAS modules to evaluate whether user requests have grants to perform requested actions on all the layers.

In some embodiments, authorization and trust management will be performed using blockchain with miners being the cloud platform owners and administrators. The trust and authorization blocks may be enforced to adhere to an agreement. Trust agreement between the blocks may, in some embodiments, define security levels and privacy between the platforms and a software solution. The agreements may be based, for example, on rules formalized in the knowledge base which also stores contextual information. Such an approach may enable multi-tenancy authorization and policy enforcement in a cloud environment.

For any abstraction layer implementation, it may be important that the system is aware of the requirements from the perspective of any organization and prevent misuse of the authorization abstraction layer. The blockchain architecture 700 of FIG. 7 may provide a single source of truth which can then be multi-clustered to implement high availability of the jump server and also geographical restriction policies for cloud and data access.

Figure 8:
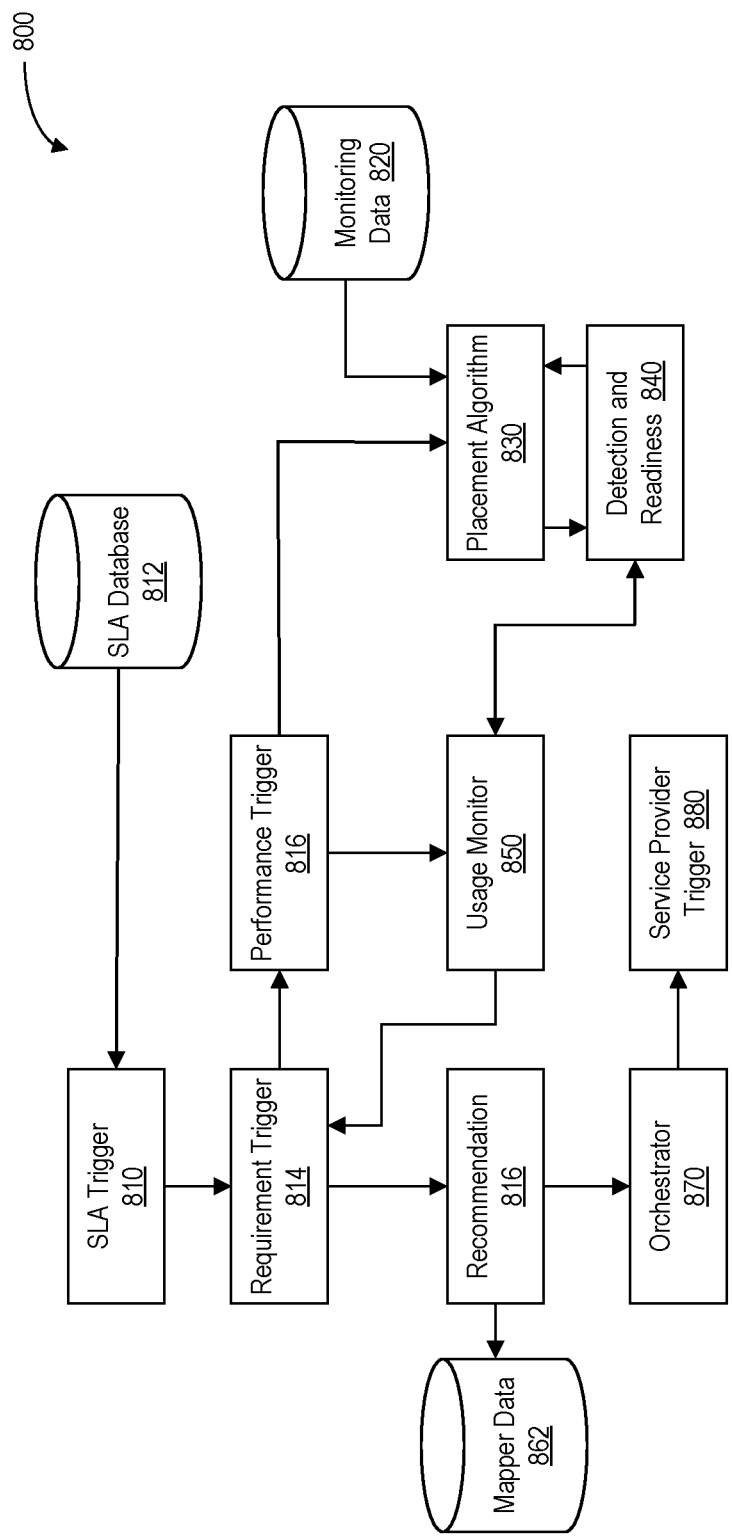
FIGS. 8 and 9 are availability scenario architectures according to some embodiments.
Figure 9:
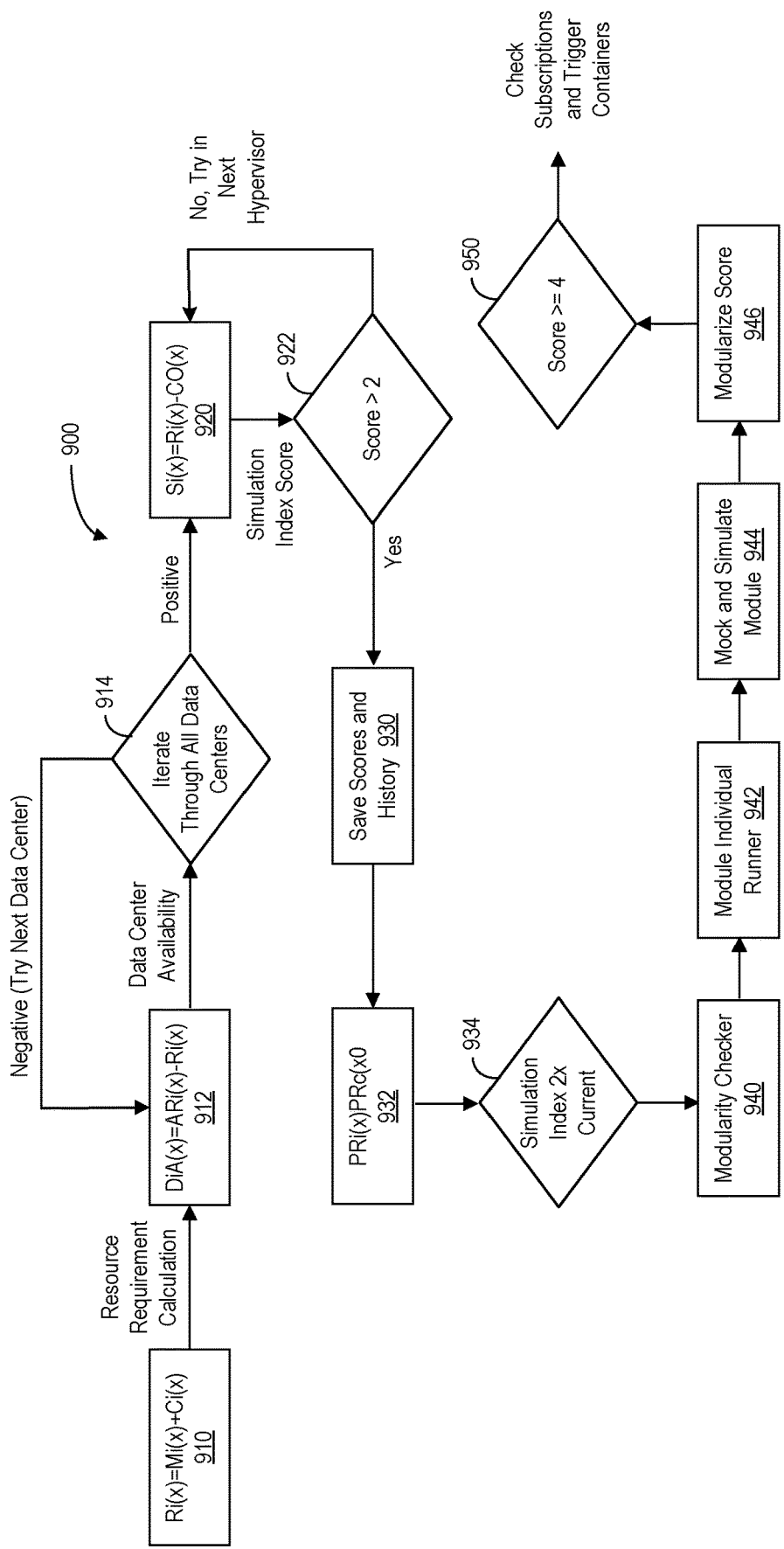

In some embodiments, data points may be recommended to increase cluster availability for a customer based on patterns of usage and availability at a hybrid infrastructure data center. For example, FIGS. 8 and 9 are availability scenario architectures according to some embodiments. In particular, FIG. 8 shows a method 800 in which a SLA trigger 810 defined in a SLA database 812 may be implemented along with a requirement trigger 814 and/or a performance trigger. The requirement trigger 8144 may result in a recommendation 816 (stored in mapper data 862) that is provided to an orchestrator 870. According to some embodiments, a service provider trigger 880 may be associated with the orchestrator 870. The performance trigger 816 may be provided to a usage monitor 850 and a placement algorithm 830. The placement algorithm 830 may also receive monitoring data 820 and interact with detection and readiness 840. In this way, patterns of usage and availability from the operations data and can be used to start recommending the data points where it will be beneficial for the cloud application development organization to operationalize at a lower cost and better service availability.

FIG. 9 shows a method 900 in which multiple data centers may be evaluated by the system. In FIG. 9, the following variables are implemented:

$Ri(x)$=resource requirement calculation for ith application, $Mi(x)$=memory requirement calculation for ith application, $Ci(x)$=CPU requirement calculation for ith application, $DiA(x)$=data center availability calculation for ith application, $ARi(x)$=current availability resource for requirement of ith application in the data center, $Si(x)$=ith application simulation score which is equal to $PRi(x)$, $COi(x)$=containerized simulated performance score based on ith application requirement, $PRi(x)$=performance score for ith application, and $PRc(x)$=performance score for current similar application as ith application in the infrastructure.

At 910, a resource requirement is calculated and used to determine data center availability at 912. The system iterates through all data centers at 914 and, if a data center is available at 922 (a "positive" result), a simulation index score is calculated at 920. When an inappropriate score is obtained, another hypervisor is selected and the process continues at 920. When an appropriate score is obtained at 922, the scores and calculation history are saved at 930. A performance score is determined at 932 and, assuming there is an appropriate simulation index at 934, a modularity checker 940 and module individual runner 942 are executed. The system may then execute mock and simulation module 944 and modularize the score 946. When that score meets a threshold at 950, the system checks subscriptions and triggers the appropriate container (e.g., a Docker or Warden container), selects an available infrastructure, etc.

All the performance indices may be calculated using an Auto-Regressive Integrated Moving Average ("ARIMA") model implementation (a class of model that captures a suite of different standard temporal structures in time series data). For example, the performance calculation for ith application ($PCi(x)$) may be measured as million runs subset of available performance metrics to calculated performance metrics ($CCi(x)$) for applications in a container environment with benchmarking for memory and CPU requirements.

According to some embodiments, automatic deployment plan optimization is enabled for lifecycle and cluster management at a hybrid infrastructure data center (that is, without manual intervention). Consider, for example, the building blocks for a container or a virtual environment. The system may often consider two important aspects:

Lifecycle Management, and

Cluster Management.

Note that the system may want to make both of these aspects easily implemented for both virtual machine or micro VM and container-based deployments. In addition, an application setup may be a unique feature of an implementation as it is not being implemented or tried out by any one. This is primarily due to the scope of the applications in the data center which renders from on-premise to on-cloud and hybrid. In order to better suit the application suite, the system may use a standardized method to deploy and build application infrastructure. As used herein the phrase "standardized method" might refer to some or all of the following:

hardened image, no additional tools, summations and averages near to 0 in cases for memory and CPU, and volume counters and summations and averages maintained for speeding up IO.

From a lifecycle management perspective, the implementation may take care of:

localized hardened global repository for images (container and ISOs), runtime engines—optimization using simulated environments, and global archival and auto monitored driver management.

From the cluster management perspective:

auto monitor using blockchain module, discovery and overlay network may be taken care partially by blockchain module and Flannel implementation (or any custom network implementation), and orchestrator and schedular may be managed for both VM/microVM and container setup.

With respect to the individual actions, a runtime engine may be associated with an interface for VM/microVM or container lifecycle management (e.g., spawn, start, stop, and destroy. For example, FIG. 10 is a runtime engine algorithm 1000 according to some embodiments. As a basic assumption, note that for a benchmark application, multi-tier application which emulates retail scenarios and workload generator to simulate load ("Sl") and performance. The parameters in the algorithm 1000 may include CPUs in use (C), memory in use (M), network bandwidth in use (N), and disk in use (D). The setup may be associated with container (Ct), virtual machine (Vm), and setup assumptions about total memory (tM) and total CPUs (tC), threshold percent for memory (thM), CPUs (thC), global data center availability (gDC), and data center choice based on a General Data Protection Regulation ("GDPR") requirement (pDC).

From the basic building block perspective, it may be important to understand how a VM will perform when pitted against a container. Even though the requirement for initial simulation may be costly, avoiding rearchitecting and wasting development costs on application modernization may make it important to help map the metrices to directly propose a deployment plan for an application. As per the algorithm 1000 in FIG. 10, the system may store the simulation results and keep considering different variation of load and architecture consideration to evaluate various application variations. The data may then be monitored, and ML models may be supervised, to generate variations in results to achieve a diverse deployment model as per the algorithm 1100 shown in FIG. 11 in accordance with some embodiments.

According to some embodiments, a problem space may be defined from a recording done for the runtime engine optimization algorithm 1000 where the system considers deployments for both VM-based and container-based application to be same. This information may form a dataset and meta-features may be considered for different application scenarios where the system changes load and application resource parameters to understand container and VM performance. The meta-features might be related to tasks like granularity, periodicity, traversity, skewness, etc. and be implemented via the meta-learning system algorithm 1100 of FIG. 11. In this way, the system may help ensure that a trained neuron will provide an optimal solution for a certain task (so the network will have learning rules supported by training epochs).

Figure 12:
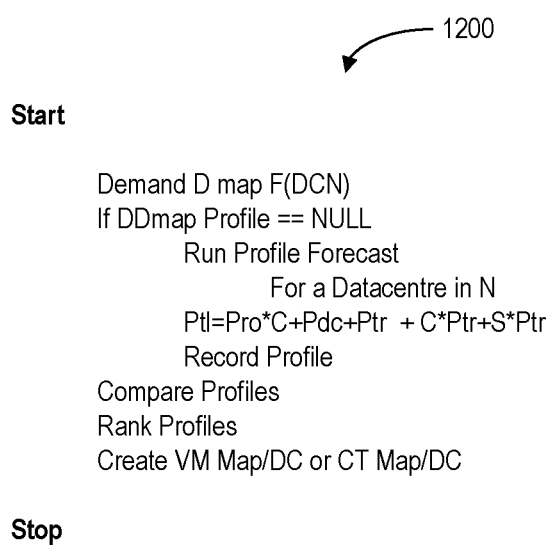
FIG. 12 is a placement algorithm across geographical data centers according to some embodiments.

Some embodiments may also be associated with placement across geographical data centers. Consider VM and container placement for applications on the fly to any data center, the system may need to consider the fact that build times and load confidence may be different for container and VM based setups (which is evident from algorithms 1000, 1100). Eventually, the system may combine the setup and build module to provide a better placement of a VM or a container in a specific or a distributed data center. That is, the system may address the placement problem in a collocated or a cross located criteria by balancing delays. FIG. 12 is a placement algorithm 1200 across geographical data centers according to some embodiments. The assumptions for this algorithm 1200 may include:
  a physical topology map: N,
  power—data center: Pdc,
  router power: Pro,
  virtual link channels: C,
  single fiber link: S, and
  transponder power: Ptr.

Along with placement, the system may measure demands which are not met for historical time stamps. This may help deduce demand risks of a host as well as VMs or containers in a way the system was not able to address the requirements specifications. In order to do so, the system may define function Du for both container and VMs to determine an individual risk score:
  Du(CT, tl, tn, DC, H)=function of container CT in a specific host H in a specific data center DC and for time frame tn to tl where demands were not met, and
  Du(VM, tl, tn, DC, H)=function of virtual machine VM in a specific host H in a specific data center DC and for time frame tn to tl where demands were not met.
These functions might be addressed using various measures, hence the system might consider resource requirements (e.g., in order): CPU, memory, bandwidth, etc.

Once the system calculates the functional difference for the demands in order of the resources from time tn to time tl, then it might consider ranking the worst-case scenario and recommend when either a VM or container-based placement might perform better. Hence, Du(CT, tl, tn, DC, H)=for ith resource, a summation of demands for tn, with a differentiation of capacity demands at tlth instance. A similar approach may apply for VMs. At this point, the system may apply continuous deployment, ongoing optimization. The concept of ongoing optimization may be to first:
  calculate a maximum relocation requirement with a location were a host for a VM or container is possible,
  based on policy restrictions, how can the system optimally relocate VM and container placements, and
  provide a best mapping criteria for host to VM/container for migration or modernization scenarios.

Figure 13:
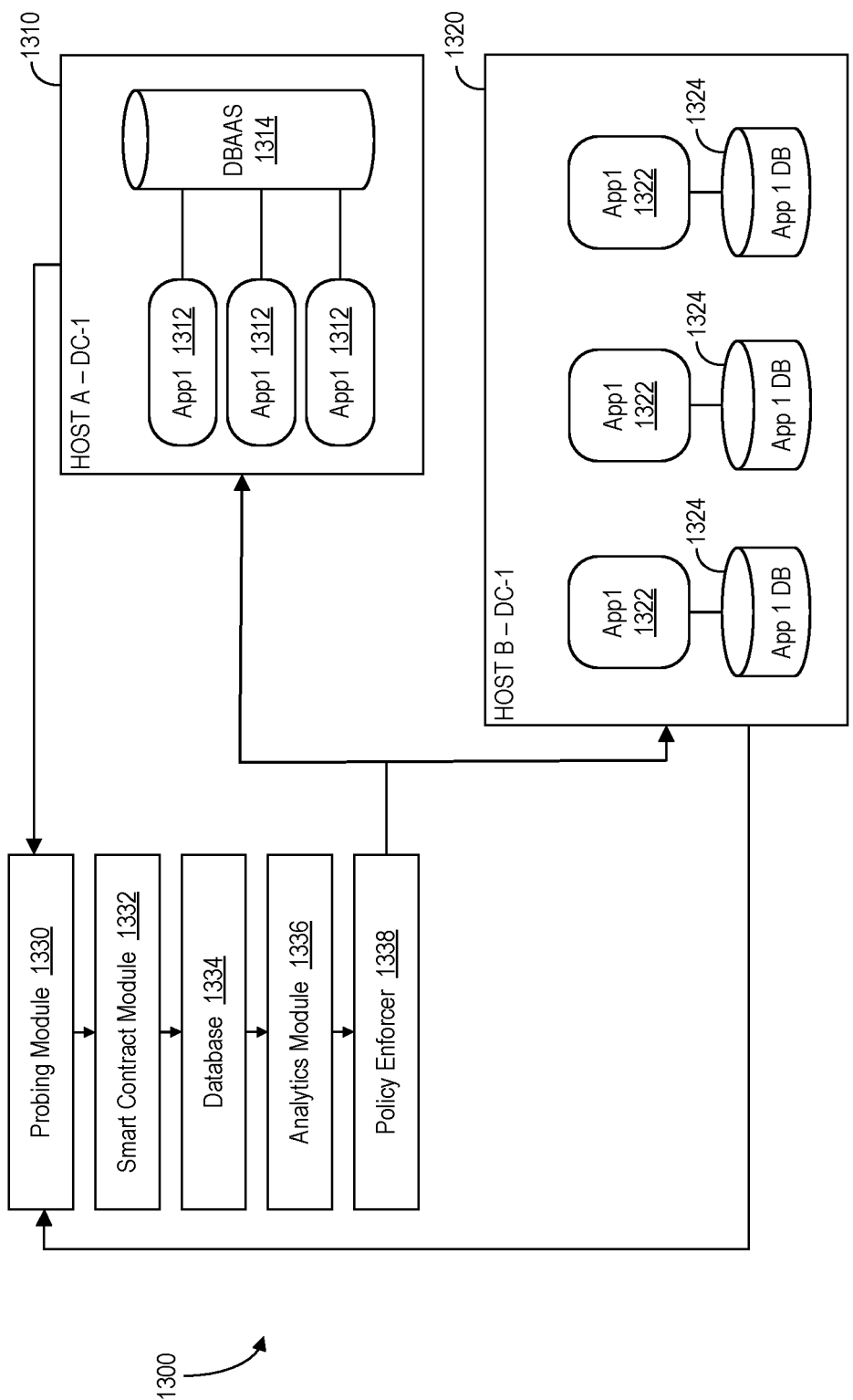
FIG. 13 is a cost reduction architecture in accordance with some embodiments.

According to some embodiments, blockchain smart contracts may reduce monitoring and new node introduction costs at a hybrid infrastructure data center. For example, FIG. 13 is a cost reduction architecture 1300 in accordance with some embodiments. "Host A" 1310 at a data center ("DC-1") is associated with multiple applications 1312 ("App1") that access a Database as a Service ("DBaaS") 1314. Similarly, "Host B" 1320 at data center "DC-1" is associated with multiple applications 1322 ("App1") that access databases 1314. A probing module 1330 receives data about both Host A 1310 and Host B 1320. The probing module 1330 may, for example, collect state information and resource consumption information based on transaction events requested by the customer. The information may be processed by a smart contract module 1332 (a mechanism to create a blockchain per application type and maintain it across all geographic locations), database 1334 (e.g., an in-memory database storing data from the probing module 1330 as well as the smart contract module 1332 for backup and analytics), and an analytics module 1336 (to enable prediction of resource and blacklisting of any new or old node based on usage and block information) before a decision is made by a policy enforcer 1338. Note that the analytics module 1336 may trigger events based on which policy enforcer module 1338 will enforce rules for the nodes in a host in a data center. Moreover, this handling of the granular level may be enabled, and, as a result, the initial setup cost may be increased. This, however, would be a one-time activity after which it will be automatically taken care of by the modules.

Such an approach may reduce the cost of monitoring and new node introduction into a data center plan. Moreover, the architecture 1300 may optimize the basic building block of identifying the VM or containers for service discovery. In case of service discovery, the unique feature will be to use blockchain to identify a new application instance (whether it is a VM or container) as blocks, and the individual blocks may be updated based on the change of states of the VM or containers itself. Note that not only states but state-based events can also be triggered using this architecture 1330.

Figure 14:
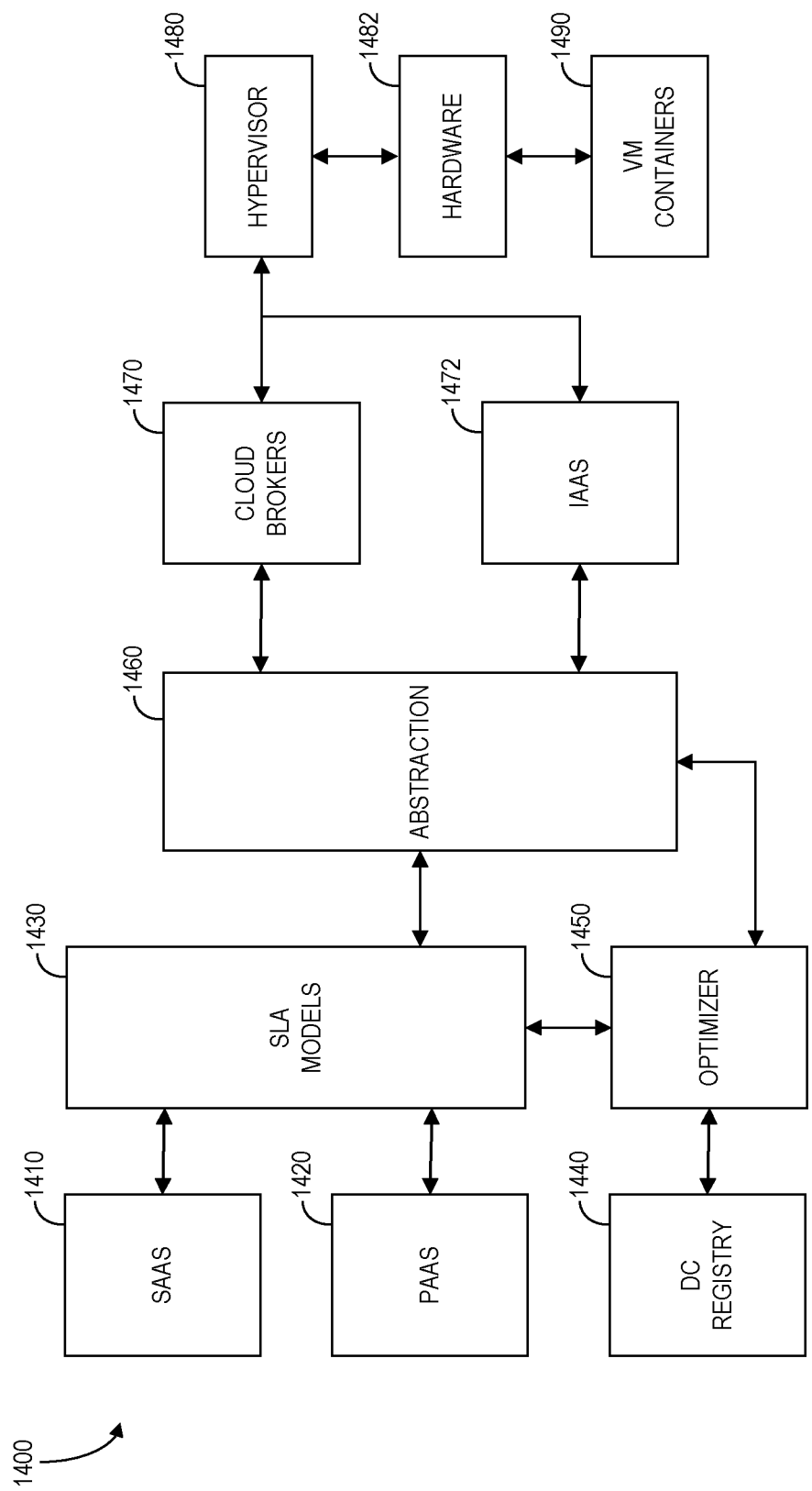
FIG. 14 is a Service Level Agreement ("SLA") management architecture according to some embodiments.

According to some embodiments, a generic manager automatically manages a service level agreement at a hybrid infrastructure data center. For example, FIG. 14 is a Service Level Agreement ("SLA") management architecture 1400 according to some embodiments. In particular, SaaS 1410 and PaaS 1420 may access SLA models 1430. In addition, a DC registry 1440 may access an optimizer 1450. After abstraction 1460, cloud brokers 1470 and IaaS 1472 may exchange information with a hypervisor 1480. The hypervisor 1480 may then manage hardware 1482 for VM/containers 1490.

In this way, the architecture 1400 of the end-to-end setup of the integration module of a hybrid infrastructure may be remodeled. Note that currently the system cannot model SLAs optimally since (since it is either vendor locked into a specific IAAS provider or, even if the system wants to optimize the SLAs, it has no scope to redefine them). Thus, embodiments may introduce the SLA models 1430 that may have service a management ability in accordance with business rules and operational plans for a data center based VM/container allocations with service-based models. This may then be mapped to (or rearchitected to) an infrastructure based on the information from details as described with respect to FIGS. 10 through 12.

Figure 15:
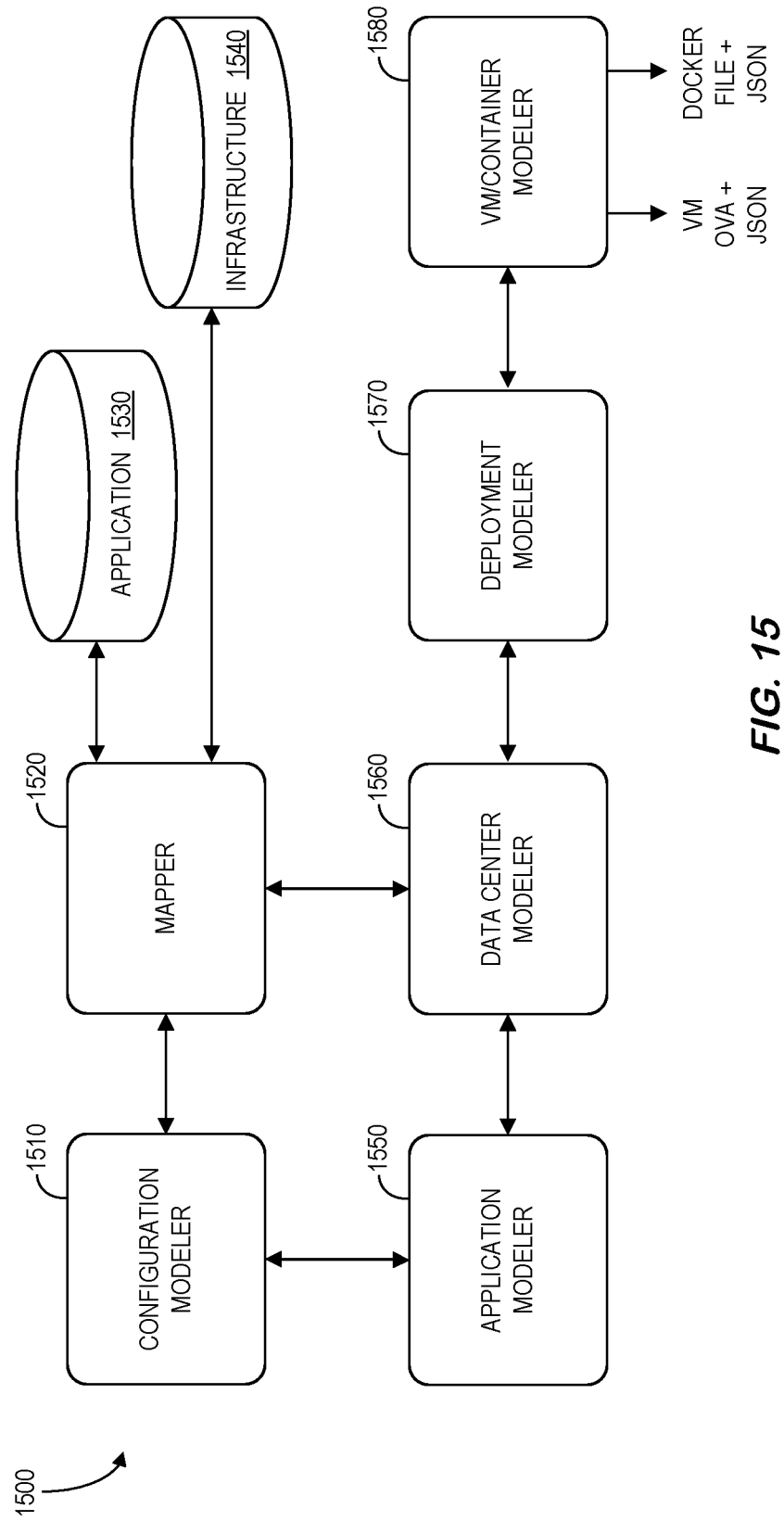
FIG. 15 is a real-time runtime environment management architecture in accordance with some embodiments.

According to some embodiments, an automated provisioning system and a ML based microservice setup platform are associated with real-time runtime environment management for a hybrid infrastructure data center. For example, FIG. 15 is a real-time runtime environment management architecture 1500 in accordance with some embodiments. In this example, a configuration modeler 1510 communicates with an application modeler 1550 and mapper 1520 (which has access to application data 1530 and infrastructure data 1540. A data center modeler 1560 receives information from the application modeler 1550 and the mapper 1560 and provides data to a deployment modeler 1570. A VM/container modeler 1580 may then output VM Open Virtual Appliance ("OVA") and JavaScript Object Notation ("JSON") or a Docker file and JSON as appropriate.

In this architecture 1500, applications may require runtime environments which are often operationalized based on SLAs arranged for a customer. Another aspect is that applications in a cloud environment may be heavily customized (as are the versions or service subscriptions). Based on the various scenarios, there may be no concrete module which can handle the application deployment scenarios on different cloud vendors based on the initial product requirement defined by a customer need. For example, a cloud provider may need to deal with configurations drift using manual review or tools like a Configuration Management Database ("CMDB"). Such approaches might involve a substantial effort to make appropriate provisioning decisions. According to some embodiments, this problem may be automatically solved using the following module that enables architects to choose which deployment mode to go with for a specific choice of vendor.

The mapper module 1520 may act an agent that interfaces an application blueprint 1530 and infrastructure blueprint 1540 to prepare configurations against which deployment scenarios may be defined (and cost evaluations are done) using the data center modeler 1560. Once configurations, application build, and install steps are identified by deployment modeler 1570, it may then be converted into JSON, VM/Docker-based formatted files for production usage. The complete module may reduce the time and cost involved with setting up multiple data centers. For initial runs, the system may create a mathematical model for each module to consume.

```
class App(AST):
    def_init_(self, left, op, right):
        self. left=left
        self.token=self.op=op
        selfright=right
class Infra(AST):
    def_init_(self, config):
        self. config=config
        self. value=config.value
```

Pseudo code associated with indexing for modules to consume:
```
class   buildMultiIndex(App   configApp)   configApp.
   appDFS←currentappDFS           currentappDFS←curren-
   tappDFS+1 configApp.numDescendants←0
   if Apps[configApp.type] is null
      then Apps[configApp.type]←DynamicArray<App>
   end if
      var   configApps←Apps[configApp.type]      config
         Apps.add(configApp) for each App dependant in
         configApp.dependantren
         buildIndexApp(dependant)
   next
```

The multi-model index may let the modules tweak and add the configurations and build either an OVA module or a docker file module with configurations for subscriptions to work. The system may determine the confidence of a model observing (with constant monitoring) the created models to simulate in an emulator.

Figure 16:
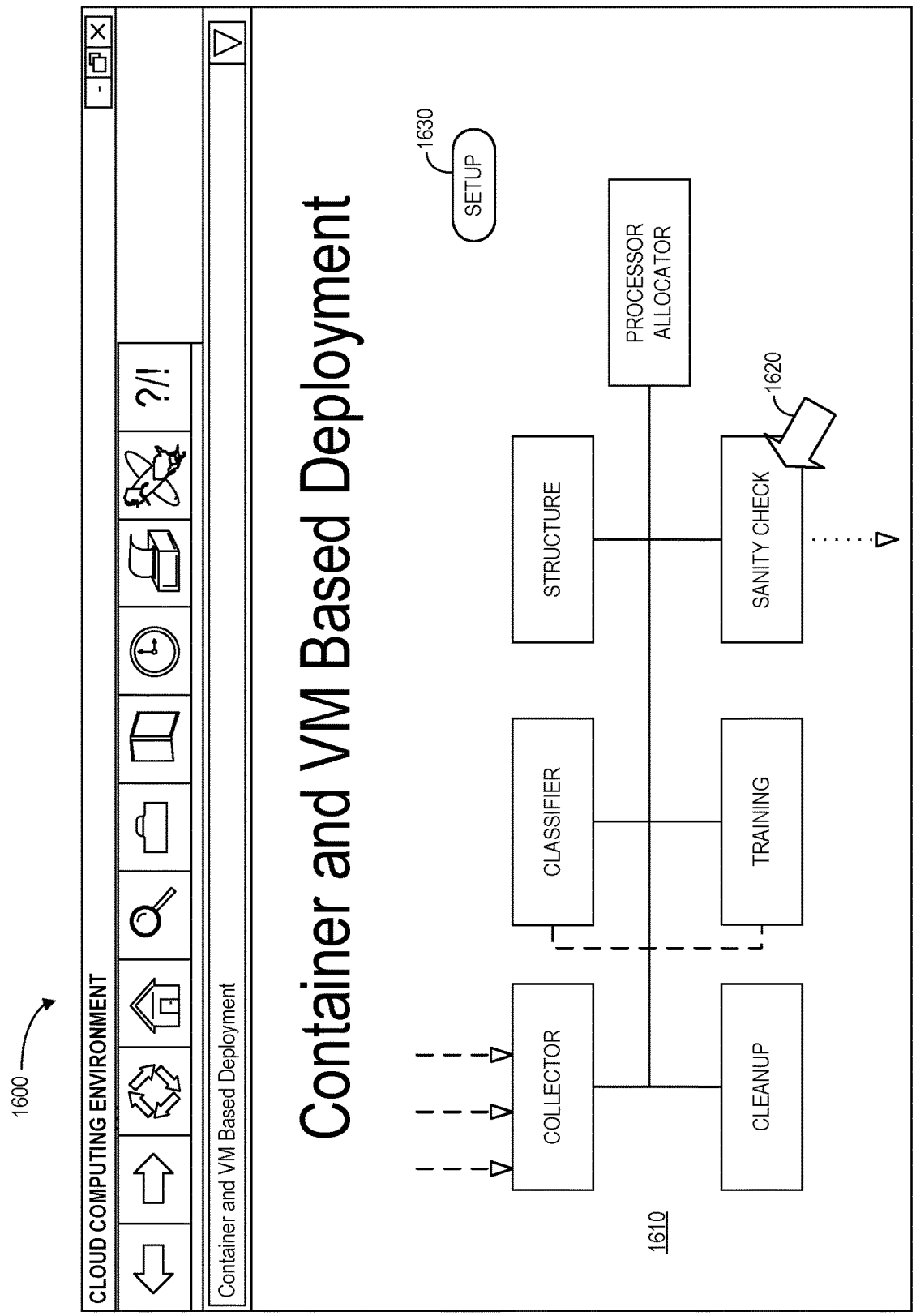
FIG. 16 is a human machine interface display in accordance with some embodiments.

According to some embodiments, an operator or administrator might setup or adjust the operation of a deployment system. For example, FIG. 16 is a human machine interface display 1600 in accordance with some embodiments. The display 1600 includes a graphical representation 1610 of elements of cloud-based computing environment (e.g., associated with VM/container deployment). Selection of an element (e.g., via a touch-screen or computer pointer 1620) may result in display of a pop-up window containing various options (e.g., to adjust rules or logic, assign various devices, change a sanity check or deployment policy, etc.). The display 1600 may also include a user-selectable "Setup" icon 1630 (e.g., to configure parameters for cloud management/provisioning as described with respect any of the embodiments of FIGS. 1 through 15).

Figure 17:
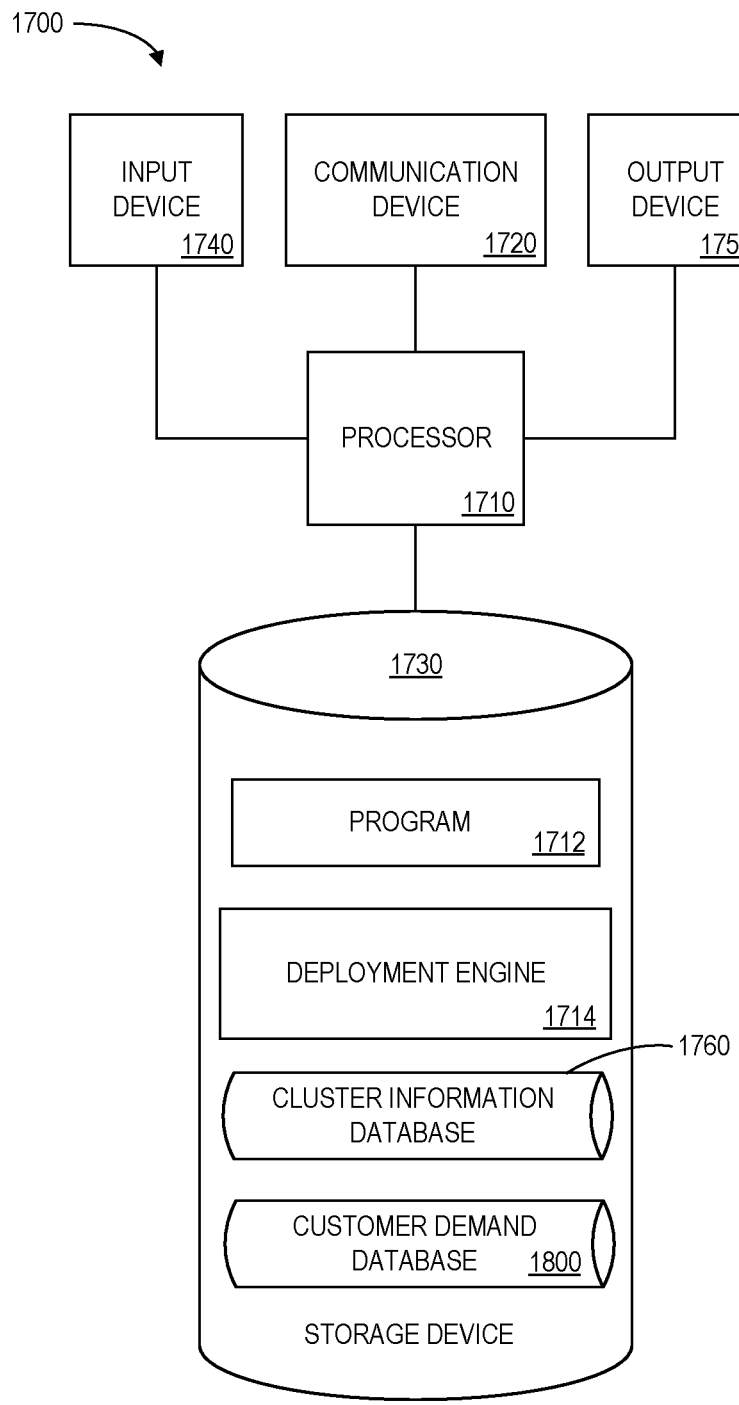
FIG. 17 is an apparatus or platform according to some embodiments.

Note that the embodiments described herein may be implemented using any number of different hardware configurations. For example, FIG. 17 is a block diagram of an apparatus or platform 1700 that may be, for example, associated with the systems 100, 400 of FIGS. 1 and 4, respectively (and/or any other system described herein). The platform 1700 comprises a processor 1710, such as one or more commercially available CPUs in the form of one-chip microprocessors, coupled to a communication device 1720 configured to communicate via a communication network (not shown in FIG. 17). The communication device 1720 may be used to communicate, for example, with one or more remote user platforms, cloud resource providers, etc. The platform 1700 further includes an input device 1740 (e.g., a computer mouse and/or keyboard to input rules or logic) and/an output device 1750 (e.g., a computer monitor to render a display, transmit recommendations or alerts, and/or create data center reports). According to some embodiments, a mobile device and/or PC may be used to exchange information with the platform 1700.

The processor 1710 also communicates with a storage device 1730. The storage device 1730 can be implemented as a single database or the different components of the storage device 1730 can be distributed using multiple databases (that is, different deployment information storage options are possible). The storage device 1730 may comprise any appropriate information storage device, including combinations of magnetic storage devices (e.g., a hard disk drive), optical storage devices, mobile telephones, and/or semiconductor memory devices. The storage device 1730 stores a program 1712 and/or a deployment engine 1714 for controlling the processor 1710. The processor 1710 performs instructions of the programs 1712, 1714, and thereby operates in accordance with any of the embodiments described herein. For example, the processor 1710 might receive a customer demand associated with an application to be executed in a cloud-based computing environment. The processor 1710 may also communicate with VM and container provisioners and determine cluster data. According to some embodiments, the processor 1710 may then execute policy rules based on the cluster data (and information about the customer demand) and generate a recommendation for the customer demand. The processor 1710 may then assign the customer demand to one of a VM-based infrastructure and a container-based infrastructure in accordance with the recommendation generated by a ML based microservice setup platform.

The programs 1712, 1714 may be stored in a compressed, uncompiled and/or encrypted format. The programs 1712, 1714 may furthermore include other program elements, such as an operating system, clipboard application, a database management system, and/or device drivers used by the processor 1710 to interface with peripheral devices.

As used herein, information may be "received" by or "transmitted" to, for example: (i) the platform 1700 from another device; or (ii) a software application or module within the platform 1700 from another software application, module, or any other source.

In some embodiments (such as the one shown in FIG. 17), the storage device 1730 further stores a cluster database 1760 and a customer demand database 1800. An example of a database that may be used in connection with the platform 1700 will now be described in detail with respect to FIG. 18. Note that the database described herein is only one example, and additional and/or different information may be stored therein. Moreover, various databases might be split or combined in accordance with any of the embodiments described herein.

Figure 18:
FIG. 18 illustrates a customer demand database in accordance with some embodiments.

Referring to FIG. 18, a table is shown that represents the customer demand database 1800 that may be stored at the platform 1800 according to some embodiments. The table may include, for example, entries identifying applications that the customer wants to execute in a cloud-based environment. The table may also define fields 1802, 1804, 1806, 1808, for each of the entries. The fields 1802, 1804, 1806, 1808 may, according to some embodiments, specify: an application identifier 1802, a customer identifier 1804, a deployment decision 1806, and deployment details 1808. The customer demand database 1800 may be created and updated, for example, when a new application is executed, a decommissioning process is performed, etc.

The application identifier 1802 might be a unique alphanumeric label or link that is associated with an end-user application that is executing in a cloud-based computing environment. The customer identifier 1804 may identify a particular customer who is asking to run the application. The deployment decision 1806 may indicate if a ML algorithm assigned the customer demand for the application to a hypervisor (VM) or container (Kubernetes), and the deployment details 1808 may provide additional information about the deployment (e.g., specific clusters executing the application, a score or ranking, etc.).

Thus, embodiments may provide deployments for cloud-based computing environment applications in an efficient and effective manner. This may improve performance of the system while efficiently utilizing infrastructure resources.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 19:
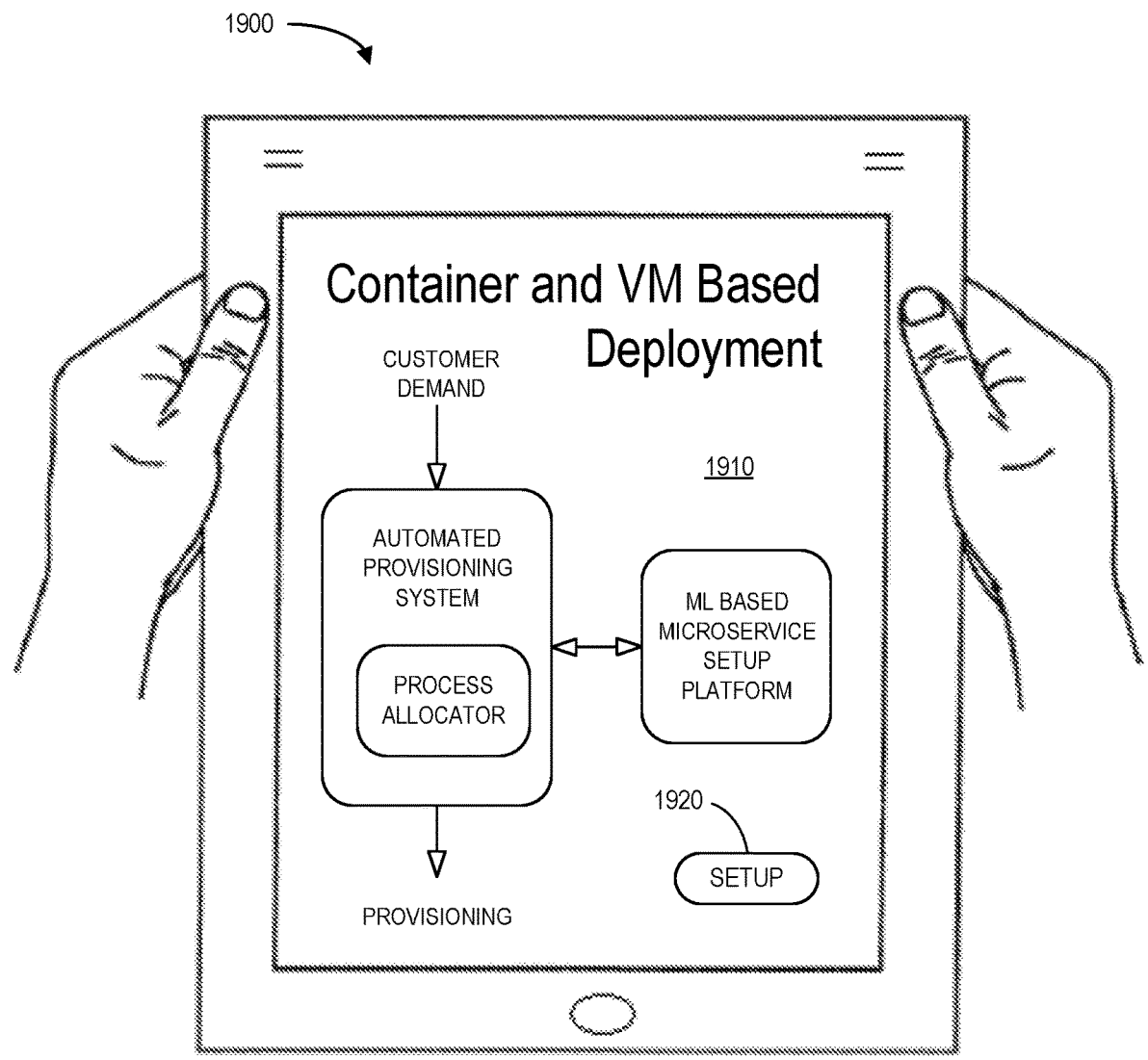
FIG. 19 illustrates a tablet computer in accordance with some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of applications and services, any of the embodiments described herein could be applied to other types of applications and services. In addition, the displays shown herein are provided only as examples, and any other type of user interface could be implemented. For example, FIG. 19 shows a tablet computer 1900 rendering a container and VM deployment display 1910. The display 1910 may, according to some embodiments, be used to view more detailed elements about components of the system (e.g., when a graphical element is selected via a touchscreen) and/or to configure operation of the system (e.g., to establish new rules or logic for the system via a "Setup" icon 1920).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system associated with a cloud-based computing environment, comprising:
  a VM-based infrastructure;
  a container-based infrastructure;
  an automated provisioning system, external to the VM-based infrastructure and container-based infrastructure, receives a customer demand associated with an application to be executed in the cloud-based computing environment, including:
    a process allocator, wherein the process allocator determines cluster data based on information from a Virtual Machine ("VM") provisioner and a container provisioner;
  a machine learning based microservice setup platform, coupled to the automated provisioning system, to:
    (i) receive the determined cluster data and the received customer demand,
    (ii) execute policy rules based on the cluster data and information about the customer demand, and
    (iii) generate a recommendation for an initial assignment of the customer demand utilizing an infrastructure cost optimization function based on both a workload response value and a Mean Time-to-Repair ("MTTR") response value, wherein the recommendation is based on: 1. a simulation via a VM and a simulation via a container for a same input resulting in a simulated VM output and a simulated container output, and 2. a comparison of the simulated VM output and the simulated container output; and
  based on the generated recommendation, the automated provisioning system deploys and executes the customer demand to one of the VM-based infrastructure and the container-based infrastructure in accordance with the generated recommendation for the initial assignment by the machine learning based microservice setup platform.

2. The system of claim 1, wherein the cluster data is associated with at least one of: (i) infrastructure parameters, (ii) network configuration parameters, and (iii) cluster availability.

3. The system of claim 1, wherein the VM-based infrastructure is associated with a hypervisor and the container-based infrastructure is associated with Kubernetes clusters.

4. The system of claim 1, wherein the automated provisioning system further includes:
  a cleanup system to clean up processed customer demands and orphaned resources.

5. The system of claim 1, wherein the automated provisioning system further includes:
  a sanity checker to perform checks before the customer demand is assigned to an infrastructure.

6. The system of claim 1, wherein the automated provisioning system further includes:
  a training system to receive an output from a classifier and facilitate training of the machine learning based microservice setup platform to handle future customer demands.

7. The system of claim 1, wherein the machine learning based microservice setup platform utilizes a scoring mechanism for application ranking per technology stack and per geographical data center location.

8. The system of claim 1, wherein automated provisioning and deprovisioning functions are associated with: (i) an archival categorization, (ii) a deletion categorization, (iii) an over-loaded categorization, and (iv) an under-loaded categorization.

9. The system of claim 1, wherein blockchain-based resource tagging is enabled for status management at a hybrid infrastructure data center.

10. The system of claim 1, wherein data points are recommended to increase cluster availability for a customer based on patterns of usage and availability at a hybrid infrastructure data center.

11. The system of claim 1, wherein automatic deployment plan optimization is enabled for lifecycle and cluster management at a hybrid infrastructure data center.

12. The system of claim 1, wherein blockchain smart contracts reduce monitoring and new node introduction costs at a hybrid infrastructure data center.

13. The system of claim 1, wherein a generic manager automatically manages a service level agreement at a hybrid infrastructure data center.

14. The system of claim 1, wherein the automated provisioning system and the machine learning based microservice setup platform are associated with real-time runtime environment management for a hybrid infrastructure data center.

15. The system of claim 1, wherein each of the simulation VM output and the simulation container output may be used by a meta-learning system algorithm employing normalization of data to generate variations in results.

16. A computer-implemented method associated with a cloud-based computing environment comprising a VM-based infrastructure and a container-based infrastructure, the method comprising:
- receiving, at an automated provisioning system external to the VM-based infrastructure and the container-based infrastructure, a customer demand associated with an application to be executed in the cloud-based computing environment;
- determining, by a process allocator of the automated provisioning system, cluster data based on information from a Virtual Machine ("VM") provisioner and a container provisioner;
- receiving, at a machine learning based microservice setup platform coupled to the automated provisioning system, the determined cluster data and the received customer demand;
- executing, by the machine learning based microservice setup platform, policy rules based on the cluster data and information about the customer demand;
- generating, by the machine learning based microservice setup platform, a recommendation for an initial assignment of the customer demand utilizing an application cost optimization function based on both a power rate value for the application and a database response value, wherein the recommendation is based on: 1. a simulation via a VM and a simulation via a container for a same input resulting in a simulated VM output and a simulated container output, and 2. a comparison of the simulated VM output and the simulated container output; and
- based on the generated recommendation, deploying and executing, by the automated provisioning system, the customer demand to one of the VM-based infrastructure and the container-based infrastructure in accordance with the generated recommendation by the machine learning based microservice setup platform.

17. A non-transitory, computer readable medium having executable instructions stored therein, the medium comprising:
- instructions to receive, at an automated provisioning system, a customer demand associated with an application to be executed in a cloud-based computing environment, wherein the cloud-based computing environment comprises a VM-based infrastructure and a container-based infrastructure, and the automated provisioning system is external to the VM-based infrastructure and the container-based infrastructure;
- instructions to determine, by a process allocator of the automated provisioning system, cluster data based on information from a Virtual Machine ("VM") provisioner and a container provisioner to determine cluster data;
- instructions to receive, at a machine learning based microservice setup platform coupled to the automated provisioning system, the determined cluster data and the received customer demand;
- instructions to execute, by the machine learning based microservice setup platform, policy rules based on the cluster data and information about the customer demand;
- instructions to generate, by the machine learning based microservice setup platform, a recommendation for an initial assignment of the customer demand utilizing a geographical cost center cost optimization function based on both an infrastructure cost and an application cost, wherein the recommendation is based on: 1. a simulation via a VM and a simulation via a container for a same input resulting in a simulated VM output and a simulated container output, and 2. a comparison of the simulated VM output and the simulated container output; and
- based on the generated recommendation, instructions to deploy and execute, by the automated provisioning system, the customer demand to one of the VM-based infrastructure and the container-based infrastructure in accordance with the generated recommendation by the machine learning based microservice setup platform.

* * * * *